Oct. 25, 1949.  K. A. HOLST  2,486,029
ELECTRIC MOTOR FOLLOW-UP APPARATUS
Filed Dec. 10, 1946  3 Sheets-Sheet 1
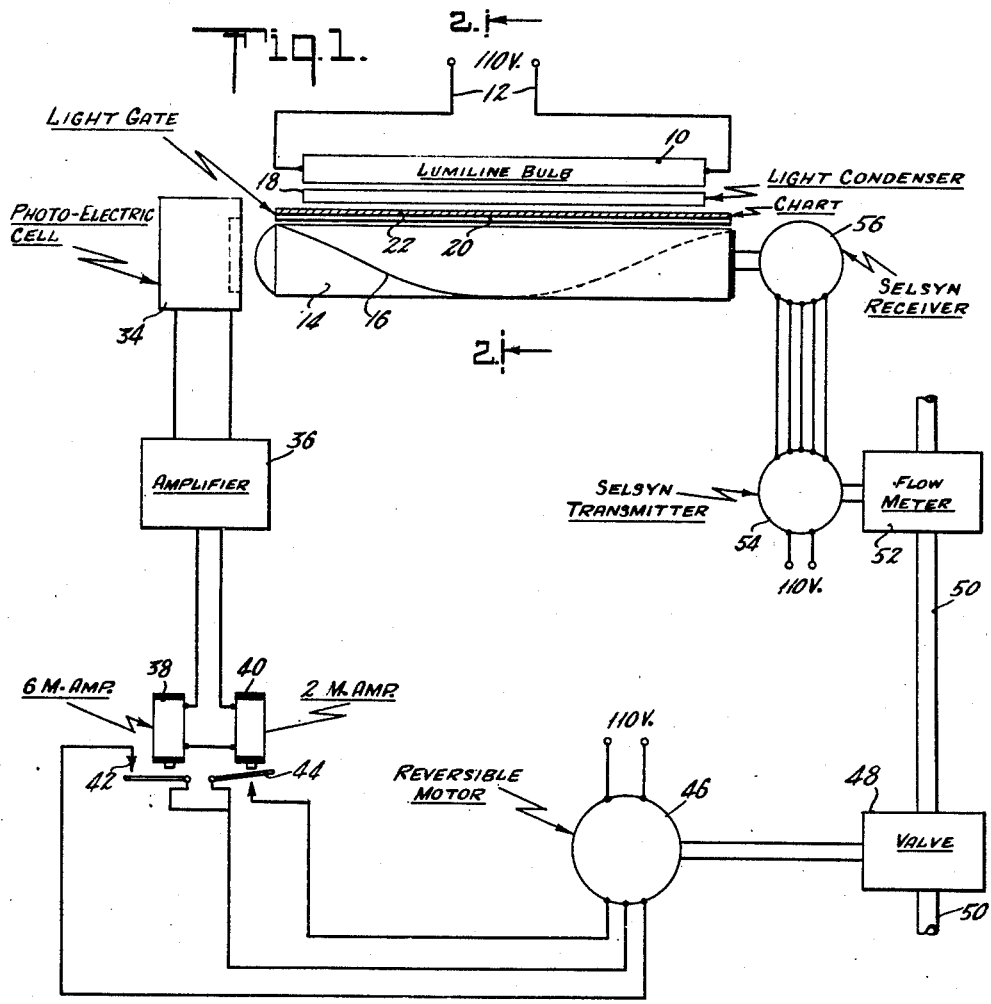
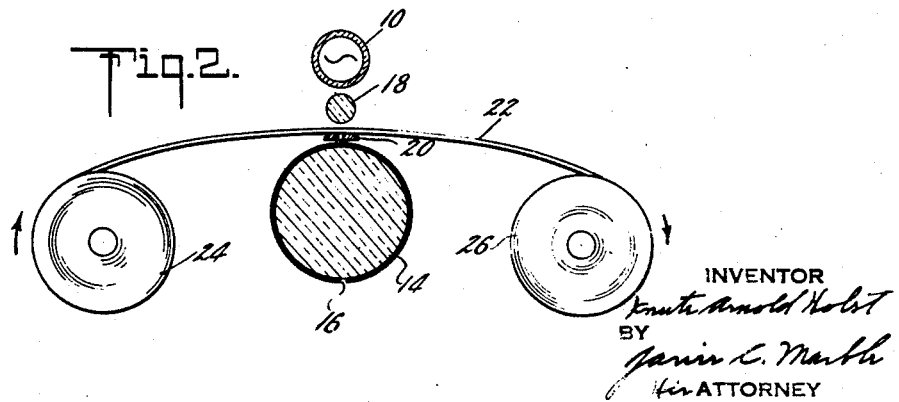
INVENTOR
Knuth Arnold Holst
BY
his ATTORNEY Oct. 25, 1949.　　　　　K. A. HOLST　　　　　2,486,029
ELECTRIC MOTOR FOLLOW-UP APPARATUS
Filed Dec. 10, 1946　　　　　　　　　　　　3 Sheets-Sheet 2
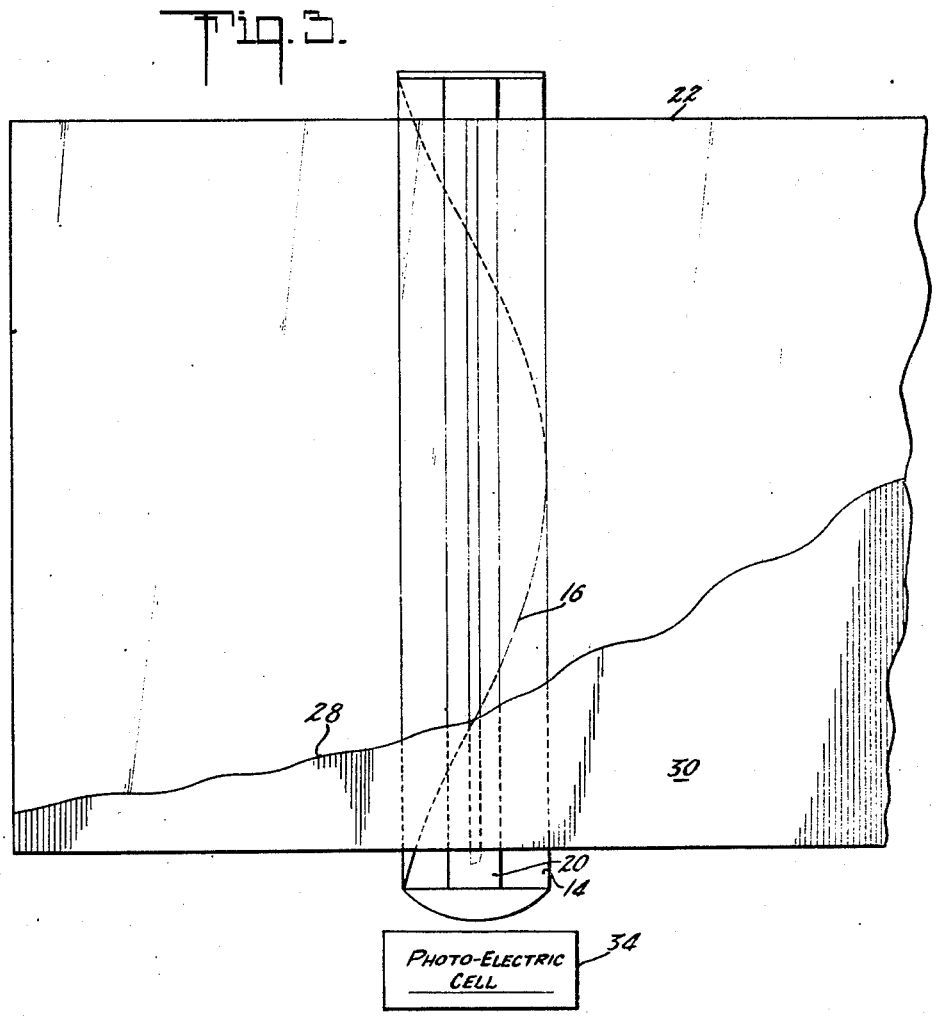
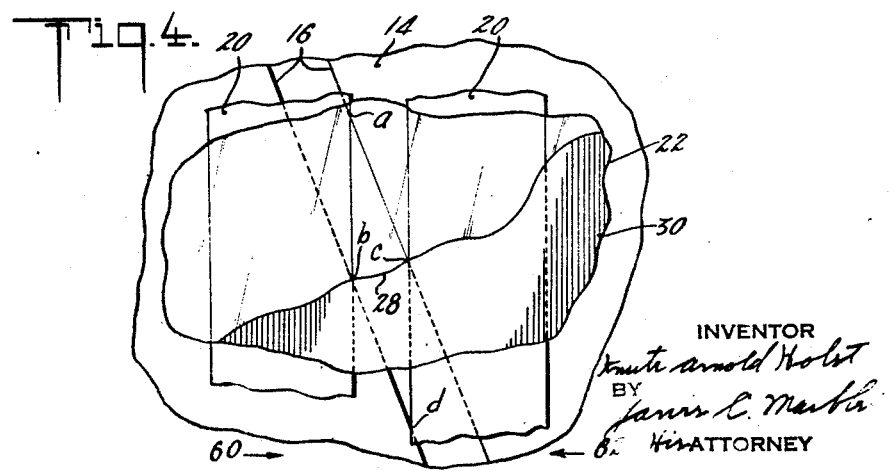
INVENTOR
Knuth Arnold Holst
BY James C. Markis
His ATTORNEY

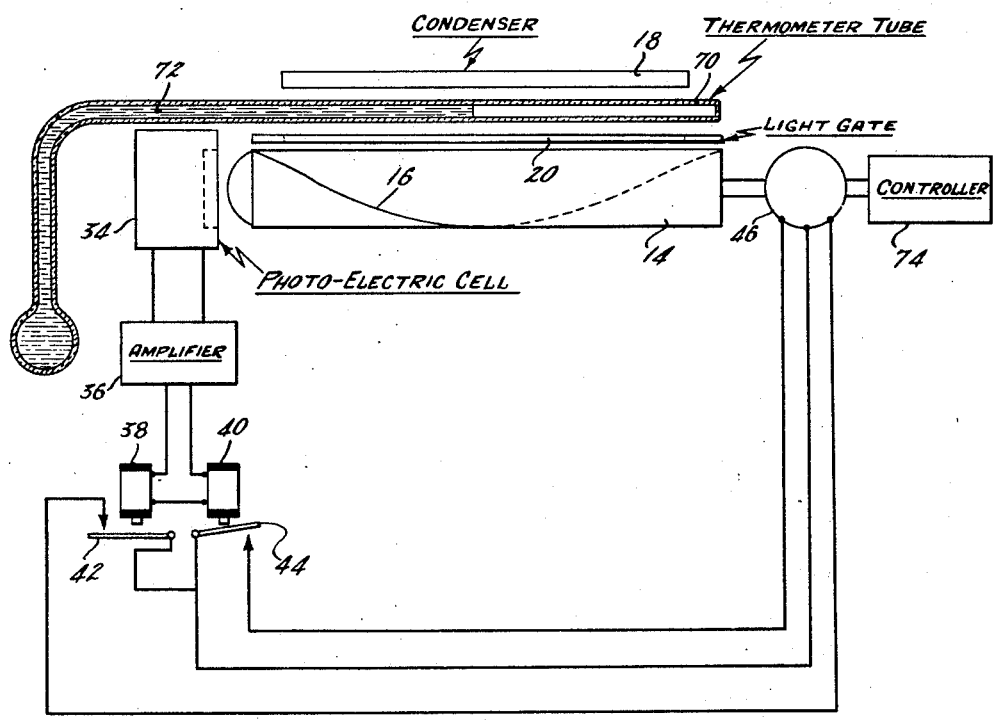

Patented Oct. 25, 1949

2,486,029

UNITED STATES PATENT OFFICE 2,486,029

ELECTRIC MOTOR FOLLOW-UP APPARATUS

Knute Arnold Holst, Astoria, N. Y., assignor to Pitometer Log Corporation, New York, N. Y., a corporation of New York Application December 10, 1946, Serial No. 715,219

5 Claims. (Cl. 318—31)

My invention relates to a mechanism for effecting a control operation in accordance with the relative displacement of an object, such as for example a curve plotted on a movable chart or a column of liquid in a thermometer or manometer tube.

Further objects and advantages of my invention will be apparent from the following description considered in connection with the accompanying drawings, which form a part of this application, and in which:

Fig. 1 is a more or less diagrammatic view of an apparatus in accordance with my invention in which the displaceable object is a curve on a movable chart;

Fig. 2 is a cross-sectional view taken on the line 2—2 of Fig. 1;

Fig. 3 is an enlarged view of a portion of the device shown in Figs. 1 and 2;

Fig. 4 is a view on a still larger scale of a portion of Fig. 3; and

Fig. 5 is a more or less diagrammatic view of another embodiment of my invention in which the displaceable object is a column of liquid in a thermometer tube.

Referring to the drawings, reference character 10 designates a suitable elongated source of light, such as a Lumiline bulb, supplied with electric current through the leads 12. This bulb is supported in a fixed position substantially parallel to a rotatably mounted cylinder 14. This cylinder is made of light transmitting material, such as Lucite. This is first covered with a light reflecting coating, such as white paint, after which the right-hand end and the cylindrical surface of cylinder 14 is made opaque, either by an opaque coating applied thereto or by being enclosed in a metal sheath. However, a transparent spiral slot 16 is formed in the cylindrical opaque covering of the cylinder. Cylinder 14 may also be a hollow shell of metal or other opaque material formed with a spiral slot 16, the inner surface of the cylinder being polished to provide a reflecting surface.

Disposed between the cylinder 14 and the bulb 10 is a light condenser 18 and a light gate 20. The former may consist of a rod of transparent material, such as glass or Lucite, which serves to gather the light rays from the bulb and concentrate them in a relatively narrow elongated band. The light gate 20 comprises a plate of opaque material, such as metal, provided with an elongated narrow slot through which the band of light from the condenser 18 passes, the purpose of the gate being to sharply define the edge of the light band.

A chart 22 is arranged to be passed at a constant speed between the light condenser 18 and the light gate 20. As shown in Fig. 2, the chart 22 may be fed from a rotatably mounted spool or reel 24 to a similar spool 26. As is more clearly shown in Fig. 3, the chart 22 is made of transparent or translucent material. On the chart there is formed a line 28 which constitutes the edge of a substantially opaque or at least a light retarding area 30, which may be formed by coating the material of the chart with an opaque paint or the like. The contour of the line 28, which delineates the boundary between the opaque and transparent portions of the chart, is in accordance with the variations in the control which the device is to effect.

The left-hand end, as viewed in Fig. 1, of the cylinder 14 is not coated with opaque material, and is preferably rounded so as to produce a lens effect for concentrating light rays passing through the cylinder. Disposed so as to intercept the light rays collected by the lens is a light responsive device such as the photo-electric cell 34. Cell 34 is connected through a suitable amplifier 36 to a pair of relays 38 and 40 connected in series. The relay 38 has a normally open contact 42 and the coil of this relay is designed to close the contact upon the passage of a certain current therethrough, for example, 6 m. amp. The relay 40 includes a normally closed contact 44 and the coil of this relay is designed to open its contact at a lower current value, for example, 2 m. amp.

The contacts 42 and 44 are arranged to control the operation of a reversible motor 46. The internal wiring of this motor is such that, if both contacts 42 and 44 are open, the motor is stationary, while the closure of one contact causes it to rotate in one direction and the closure of the other contact causes it to rotate in the opposite direction.

The motor 46 drives the device which it is desired to control in accordance with the line 28 on the chart. By way of example, this device is illustrated as a valve 48 in a pipe line 50. Operation of the motor in one direction or another increases or decreases, respectively, the flow of fluid through the pipe 50. Located in the pipe 50 is a flow meter 52, which is a well known device, responsive to variations in flow of fluid therethrough.

Connected to be operated by the flow meter is a Selsyn transmitter 54 which is connected electrically with a Selsyn receiver 56 the shaft of which is connected either directly or through a suitable gear reduction with the cylinder 14 so as to rotate the cylinder in accordance with change in the rate of flow through the flow meter. Obviously, the Selsyns may be omitted if it is convenient to locate the flow meter adjacent to the cylinder 14 so that the latter may be driven mechanically by the flow meter.

The above described device operates as follows: Light from the bulb 10, as concentrated by the light condenser 18, falls as a narrow band on the chart 22 between the condenser and the light gate 20 and the portion of the band which strikes the transparent part of the chart passes therethrough and through the light gate and falls on the surface of the cylinder. However, this surface is opaque except for the spiral slot 16. Hence the only part of the light band which may enter the cylinder is that which passes through the small section of the spiral slot 16 which is at the top of the cylinder and which is not covered by the opaque portion of the chart. Thus, in Fig. 4, light may pass through the portion of the slot 16 defined by the lines ab, bc, and ca. Light is prevented from passing through that portion of the slot 16 bounded by the lines bc, cd, and db because such portion of the slot is underneath the opaque part of the chart, and no light can pass through any other portions of the slot because such other portions are on one side or the other of the light band as defined by the slot in the light gate 20. The intensity of the light thus entering the transparent cylinder 14, and transmitted therethrough to the photo-electric cell 34 causes the latter to generate a current which, when amplified in the amplifier 36, has a value of between 2 and 6 m. amp. Consequently, the relay 40 is energized so as to open the contact 44, while the relay 38 is not energized and hence its contact 42 remains open. Therefore, the motor 46 is idle and the flow of fluid through line 50 remains constant. The flow meter 52, therefore, does not change its setting and the Selsyns 54 and 56 are idle and the cylinder 14 is not rotated.

As the chart 22 moves through the apparatus, the point at which the line 28 intersects the slot in the light gate changes whenever the line 28 is not parallel to the edge of the chart. If the chart is moved in the direction of the arrow 60 in Fig. 4 it will be seen that the position of the line 28 will move downwardly with respect to the slot in the light gate, so that a portion of the area bounded by the lines bc, cd and db, which previously received no light, will now be illuminated. This permits more light to be transmitted through the cylinder and this in turn increases the output of the photo-electric cell 34. When this output is increased sufficiently so that when amplified it has a value of 6 m. amp., relay 38 is energized so as to close the contact 42 which in turn causes the reversible motor 46 to run in one direction, for instance so as to reduce the flow through the valve 48. This reduction of flow through the valve and hence through the pipe 50, causes the setting of the flow meter 52 to be changed, thus rotating the shaft of the Selsyn transmitter 54. The receiver 56 follows the rotation of the transmitter and rotates the cylinder 14 in the proper direction, namely, in the direction of the arrow 62 in Fig. 4, to cause the spiral slot 16 in its opaque surface to move with respect to the slot in the light gate so as to bring more of the slot 16 under the opaque portion of the chart 22. This in turn reduces the amount of light entering the cylinder and hence the relay 38 is deenergized so as to open the circuit to the motor 46.

Should the contour of the line 28 on the chart be such that, as the chart advances, a portion of the area bounded by the lines ab, bc and ca in Fig. 4 be covered by the opaque portion of the chart, the quantity of light entering the cylinder is reduced, and when the reduction is sufficient so that the output of the photo-electric cell, as amplified, drops to less than 2 m. amp. the relay 40 is deenergized so as to close its contact 44, thus causing the motor 46 to operate in the opposite direction, so as to increase the flow through the valve 48. This in turn causes the flow meter to drive the transmitter 54 in the opposite direction from that previously assumed and consequently the receiver 56 rotates the cylinder 14 in the proper direction to move the spiral slot 16 in the cylinder with respect to the slot in the light gate so that more light enters the cylinder.

It will thus be seen that the flow through the pipe line 50 is increased and decreased in accordance with the rise and fall of the line 28 on the chart. Under some circumstances, it may be desirable for the reversible motor 46 to directly turn the cylinder 14, instead of through the intermediary of the medium which is to be controlled. This, however, in the example shown, would require an accurate calibration of the valve 48 in order that equal angular movements of the valve by the motor 46 would result in equal changes in flow through the valve for the entire range from fully closed to fully opened position. Such calibration is difficult and the necessity therefor is avoided by utilizing the change in the rate of flow itself to effect the proper rotation of the cylinder 14.

In Fig. 5 there is illustrated an embodiment of a device in accordance with my invention, in which the mechanism follows the movement of a liquid column in a thermometer tube, and in which the reversible motor 46 is connected by means of a direct mechanical drive with the transparent roller 14, as well as with the mechanism for controlling the condition to be regulated. Referring to this figure, reference character 70 designates a thermometer tube in which is located a column of liquid 72, such as mercury or other liquid. If this liquid be alcohol, for example, sufficient coloring matter should be added so as to make it either opaque or at least capable of retarding the transmission of light. The tube 70 is disposed between the light condenser 18 and the light gate 20 so that the position of the end of column 72 within the tube determines the length of the narrow band of light which passes through gate 20 and falls on the cylinder 14.

The photo-electric cell 34, amplifier 36 and relays 38 and 40 for controlling the reversible motor 46 are the same as described in connection with Fig. 1. However, this motor is mechanically connected to the cylinder 14, either directly as shown or through a suitable gear reduction. The motor also is connected mechanically with a controller 74 which may be of any suitable kind for controlling the condition which is to be regulated in accordance with changes in position of the liquid column 72.

If the end of the liquid column occupies about the position of the line bc in Fig. 4, it will permit light to enter that portion of the spiral slot 16 which is in alignment with the slot in the light gate 20 and is also beyond the end of the column. However, the column of liquid will interrupt the light which would otherwise enter the other portion of the spiral slot which is in alignment with the slot in the light gate. As previously explained, under these conditions the light transmitted through the cylinder to the photo-electric cell causes the latter to generate a current which, when amplified, is sufficient to energize relay 40 but not the relay 38. Consequently, the circuit to the motor 46 is open and the latter does not operate. However, should the temperature to which the thermometer is subjected increase, thus causing expansion of the liquid and a lengthening of the liquid column 72, the exposed area of the slot 16 is reduced with an accompanying reduction in the amount of light transmitted through the cylinder to the photo-electric cell. This causes deenergization of relay 40 and the closing of its contact 44 so as to cause the motor 46 to run in the proper direction to rotate the cylinder 14 in the direction of the arrow 60 in Fig. 4. This in turn brings more of the spiral slot 16 into alignment with the narrow band of light passing through the slot in the light gate beyond the end of the liquid column, which in turn increases the light transmitted to the photo-electric cell, thus again energizing relay 40 and stopping the motor 46. The operation of the motor also effects a change in the controller 74 so that the condition controlled thereby is regulated in accordance with the change in temperature affecting the thermometer.

Conversely, movement of the liquid column 72 in the opposite direction increases the amount of light transmitted to the photo-electric cell so that the relay 38 is energized to close its contact 42, thus causing the motor 46 to run in the opposite direction until the balance is restored, at the same time making the necessary adjustment of the controller 74.

While I have shown and described two more or less specific embodiments of my invention, it is to be understood that this has been done for purposes of illustration only and that the scope of my invention is not to be limited thereby but is to be determined from the appended claims.

What is claimed:

1. In a device of the class described, a cylinder capable of transmitting light having a cylindrical surface opaque except for a transparent spiral line, a source of light disposed to project an axially extending line of light onto the surface of said cylinder which intersects said transparent line, a light responsive cell arranged to receive light conducted through said cylinder from the area of said intersection, a member interposed between said source and said cylinder to vary the light transmitting portion of said area for increasing or decreasing the intensity of light supplied to said cell, means mounting said cylinder for rotation, driving means connected to rotate said cylinder, and means actuated by said cell to cause said driving means to rotate said cylinder in a direction to restore said portion to its original value.

2. A device as set forth in claim 1 in which said interposed means comprises a chart having an opaque area and a transparent area divided by a line to be followed and means mounting said chart for movement transversely of said line of light whereby said cylinder is driven in one direction or the other according to the slope of said line as it advances across said line of light.

3. A device as set forth in claim 1 in which the means actuated by said cell comprises a pair of relays connected to be energized in response to the current output of said cell, one of said relays being energized by a relatively low current and the other being energized by a higher current, and a reversible motor controlled by said relays.

4. In a device as set forth in claim 2, a condition control device connected to be driven by said driven means, a condition responsive device connected to drive said cylinder whereby said condition is varied in accordance with said chart.

5. A device as set forth in claim 4, in which said condition control device comprises a valve to control the flow of fluid and said condition responsive device comprises a flow meter responsive to the flow of fluid.

KNUTE ARNOLD HOLST.

REFERENCES CITED

The following references are of record in the file of this patent:

UNITED STATES PATENTS

| Number | Name | Date |
|---|---|---|
| 2,371,963 | LaPierre | Mar. 20, 1945 |
| 2,377,698 | Kettering et al. | June 5, 1945 |

OTHER REFERENCES

Article in "Electronics," entitled "Photo Tube For Biological Recording," published in April 1944 (pages 230, 232 and 234).